US007830065B2

(12) United States Patent
Gunderson

(10) Patent No.: US 7,830,065 B2
(45) Date of Patent: Nov. 9, 2010

(54) SOLID STATE ELECTRIC GENERATOR

(75) Inventor: Graham Alan Gunderson, Spokane, WA (US)

(73) Assignee: Chava LLC, Coral Gables, FL (US)

( * ) Notice: Subject to any disclaimer, the term of this patent is extended or adjusted under 35 U.S.C. 154(b) by 318 days.

(21) Appl. No.: 11/336,337

(22) Filed: Jan. 20, 2006

(65) Prior Publication Data

US 2006/0163971 A1 Jul. 27, 2006

Related U.S. Application Data

(60) Provisional application No. 60/645,674, filed on Jan. 21, 2005.

(51) Int. Cl.
*H02K 1/22* (2006.01)
(52) U.S. Cl. ..................................... 310/267
(58) Field of Classification Search ................ 310/267, 310/46; 336/181, 182
See application file for complete search history.

(56) References Cited

U.S. PATENT DOCUMENTS 4,103,197 A * 7/1978 Ikegami et al. .............. 310/267
4,639,626 A * 1/1987 McGee ....................... 310/155
4,763,093 A * 8/1988 Cirkel et al. ................. 336/58
7,142,085 B2 * 11/2006 Phadke ....................... 336/229
2007/0115085 A1 * 5/2007 Clemmons .................. 336/181

* cited by examiner

*Primary Examiner*—Nguyen N Hanh
(74) *Attorney, Agent, or Firm*—Gary Hoenig

(57) ABSTRACT

A solid-state electrical generator including at least one permanent magnet, magnetically coupled to a ferromagnetic core provided with at least one hole penetrating its volume; the hole(s) and magnet(s) being placed such that the hole(s) penetrating the ferromagnetic core's volume intercept flux from the permanent magnet(s) coupled into the ferromagnetic core. A first wire coil is wound around the ferromagnetic core for the purpose of moving the coupled permanent magnet flux within the ferromagnetic core. A second wire is routed through the hole(s) penetrating the volume of the ferromagnetic core, for the purpose of intercepting this moving magnetic flux, thereby inducing an output electromotive force. A changing voltage applied to the first wire coil causes coupled permanent magnet flux to move within the core relative to the hole(s) penetrating the core volume, thus inducing electromotive force along wire(s) passing through the hole(s) in the ferromagnetic core. The mechanical action of an electrical generator is thereby synthesized without use of moving parts.

11 Claims, 4 Drawing Sheets

US 7,830,065 B2

SOLID STATE ELECTRIC GENERATOR

This application claims priority to Provisional Application 60/645,674 filed Jan. 21, 2005, entitled PERMANENT MAGNET DRIVEN ELECTRIC GENERATOR.

BACKGROUND OF THE INVENTION

1. Field of the Invention

This invention relates to a method and device for generating electrical power using solid state means.

2. Description of the Related Art

It has long been known that moving a magnetic field across a wire will generate an electromotive force (EMF), or voltage, along the wire. When this wire is connected in an electrical closed circuit, in order to perform work, an electric current is driven through this closed circuit by the induced electromotive force.

It has also long been known that this resulting electric current causes the closed circuit to become encircled with a secondary, induced magnetic field, whose polarity opposes the primary magnetic field that first induced the EMF. This magnetic opposition creates mutual repulsion as a moving magnet moves toward such a closed circuit and attraction as that moving magnet then moves away from the closed circuit. Both these actions tend to slow, or "drag" the progress of the moving magnet generating the EMF, causing the electric generator to act as a magnetic brake, in direct proportion to the amount of electric current produced.

Gas engines, hydroelectric dams and steam-fed turbines have historically been used to overcome this magnetic braking action occurring within mechanical electric generators. A large amount of mechanical power is ultimately required to produce a large amount of electrical power, since the magnetic braking interaction resulting from induced electrical current is generally proportional to the amount of power being generated.

There has been a long felt need for a generator which reduces this well-known magnetic braking interaction, while nevertheless generating useful electric power. When the magnetic fields within a generator are caused to move and interact efficiently electric power can be supplied with far greater economy. Improving power generating and conversion efficiencies also increases the power capability of a device thereby, inter alia, providing a mechanism to reduce the size and weight of the generating device. Smaller and higher power density devices are particularly useful in applications such as aviation, automotive, and portable electronics including hand held devices.

SUMMARY OF THE INVENTION

It has long been known that the source of the magnetism within a permanent magnet is a spinning electric current within ferromagnetic atoms of certain elements, persisting indefinitely in accord with well-defined quantum rules. This atomic current encircles each atom, thereby causing each atom to emit a magnetic field, as a miniature electromagnet.

This atomic current does not exist in magnets alone. It also exists in ordinary metallic iron, and in any element or metallic alloy that can be "magnetized", that is, exhibits ferromagnetism. All ferromagnetic atoms and "magnetic metals" contain such quantum atomic electromagnets.

In specific ferromagnetic materials, the orientation axis of each atomic electromagnet is flexible. The orientation of magnetic flux within, as well as external to the material, easily pivots. Such materials are referred to as magnetically "soft", due to this magnetic flexibility.

Permanent magnet materials are magnetically "hard". The orientation axis of each atomic electromagnet is fixed in place within a rigid crystal structure. The total magnetic field produced by these atoms cannot easily move. This constraint permanently aligns the field of ordinary magnets, hence the name "permanent".

The axis of circular current flow in one ferromagnetic atom can direct the axis of magnetism within another ferromagnetic atom, through a process known as spin exchange. This gives a soft magnetic material, like raw iron, the useful ability to aim, focus, and redirect the magnetic field emitted from a magnetically hard permanent magnet.

In the present invention, a permanent magnet's rigid field is sent into a magnetically flexible, "soft" magnetic material. The permanent magnet's apparent location, observed from points within the magnetically soft material, will effectively move, vibrate, and appear to shift position when the magnetization of the soft magnetic material is modulated by ancillary means (much like the sun, viewed while underwater, appears to move when the water is agitated). By this mechanism, the motion required for generation of electricity can be synthesized within a soft ferromagnetic material, without requiring physical movement or an applied mechanical force.

The present invention is believed to synthesize virtual motion of magnets and their magnetic fields thereby providing highly efficient energy conversion. The present invention describes an electrical generator wherein magnetic braking phenomena, known as expressions of Lenz's Law, do not oppose the means by which the magnetic field energy is caused to move. This synthesized magnetic motion is aided by forces generated in accordance with Lenz's Law, in order to aid the synthesized magnetic motion, instead of physical "magnetic braking". Because of this novel magnetic interaction, the solid-state static generator of the present invention provides a highly efficient energy conversion apparatus.

BRIEF DESCRIPTION OF THE DRAWINGS

So that the above-recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
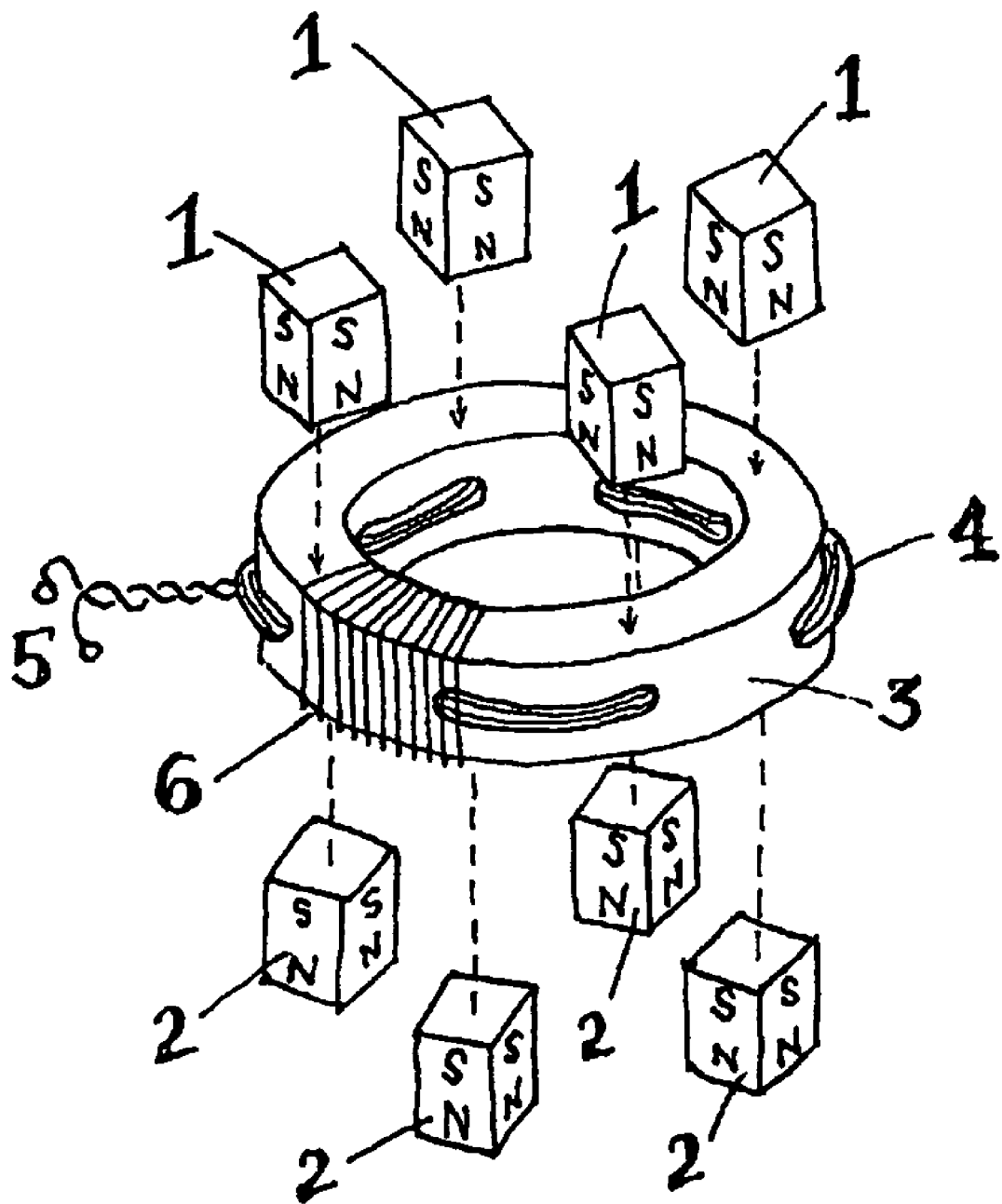
FIG. 1 is an exploded view of the generator of this invention.

FIG. 1 depicts a partially exploded view of an embodiment of an electric generator of this invention. The parts have been numbered, with the numbering convention applied to FIGS. 1, 2, and 3.

Numeral 1 represents a permanent magnet with its North pole pointing inward toward the soft ferromagnetic core of the device. Similarly, numeral 2 indicates permanent magnets of preferably the same shape and composition, with their South poles aimed inward toward the opposite side, or opposite surface of the device. The letters "S" and "N" denote these respective magnetic poles in the drawing. Other magnetic polarities and configurations may be used with success; the pattern shown merely illustrative of one efficient mode of adding magnets to the core.

The magnets may be formed of any polarized magnetic material. In order of descending effectiveness, the most desirable permanent-magnet materials are Neodymium-Iron-Boron (NIB) magnets, Samarium Cobalt magnets, AlNiCo alloy magnets, or "ceramic" strontium-, barium- or lead-ferrite magnets. A primary factor determining permanent magnet material composition is the magnetic flux strength of the particular material type. In an embodiment of the invention, these magnets may also be substituted with one or more electromagnets producing the required magnetic flux. In another embodiment of the invention, a superimposed DC current bias can be applied to the output wire to generate the required magnetic flux, in substitution of, or in conjunction with said permanent magnets.

Numeral 3 indicates the magnetic core. This core is a critical member of the generator, determining the characteristics of output power capacity, optimal magnet type, electrical impedance, and operating frequency range. This core may be any shape, composed of any ferromagnetic substance, formed by any process (sintering, casting, adhesive bonding, tape winding, etc). A wide spectrum of geometries, materials, and processes are known in the art of magnetic cores. Effective common materials include, but are not limited to, amorphous metal alloys (such as that sold under the trademark designation "Metglas" by Metglas Inc., Conway S.C.), nanocrystalline alloys, manganese and zinc ferrites as well as ferrites of any suitable element including any combination of magnetically "hard" and "soft" ferrites, powdered metals and ferromagnetic alloys, laminations of cobalt and/or iron, and silicon-iron "electrical steel". This invention successfully utilizes any ferromagnetic material, while functioning as claimed. In an embodiment of the invention, and for the purpose of illustration, a circular "toroid" core is illustrated. In an embodiment of the invention, the composition may be bonded iron powder, commonly available from many manufacturers.

Regardless of core type, the core is prepared with holes, through which wires may pass, which have been drilled or formed to penetrate the core's ferromagnetic volume. The toroidal core 3 shown includes radial holes pointing toward a common center. If, for example stiff wire rods were to be inserted through each of these holes, these wires would meet at the center point of the core, producing an appearance similar to a spoke wheel. If a square or rectangular core (not illustrated) is used instead, these holes are preferably oriented parallel to the core's flat sides, causing stiff rods passed through the holes to form a square grid pattern, as the rods cross each other in the interior "window" area framed by the core. While in other embodiments of the invention, these holes may take any possible orientation or patterns of orientation within the scope of the present generator, a simple row of radial holes is illustrated herein as one example.

Numeral 4 depicts a wire or bundle of wires, i.e. output wire 4, that pick-up and carry the generator's output power. Typically this wire is composed of insulated copper, though other output mediums such as aluminum, iron, dielectric material, polymers, and semiconducting materials may be substituted. It may be seen in FIG. 1 and FIG. 2 that wire 4, which serves as an output medium, passes alternately through neighboring holes formed in core 3. The path taken by wire 4 undulates, passing in an opposite direction through each adjacent hole. If an even number of holes is used, the wire will emerge on the same side of the core it first entered on, once all holes are filled. The resulting pair of trailing leads may be twisted together or similarly terminated, forming the output terminals of the generator shown at Numeral 5. Output wire 4 may also make multiple passes through each hole in the core. Though the winding pattern is not necessarily undulatory; this basic form is shown by way of example. Many effective connection styles exist; this illustration shows the simplest. All successful connection methods pass wire 4 at some point through the holes in the core.

Figure 2:
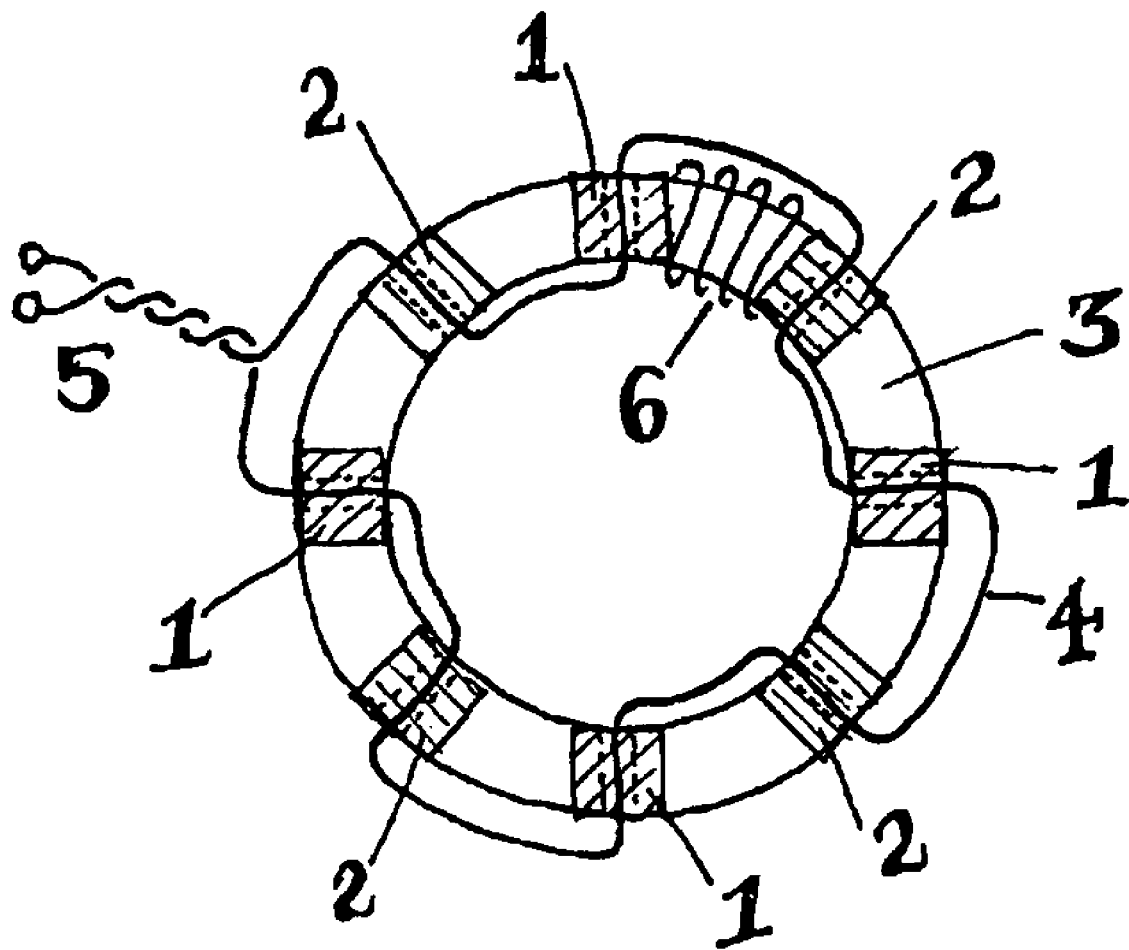
FIG. 2 is a top plan cross sectional view of the generator of this invention.
Figure 3:
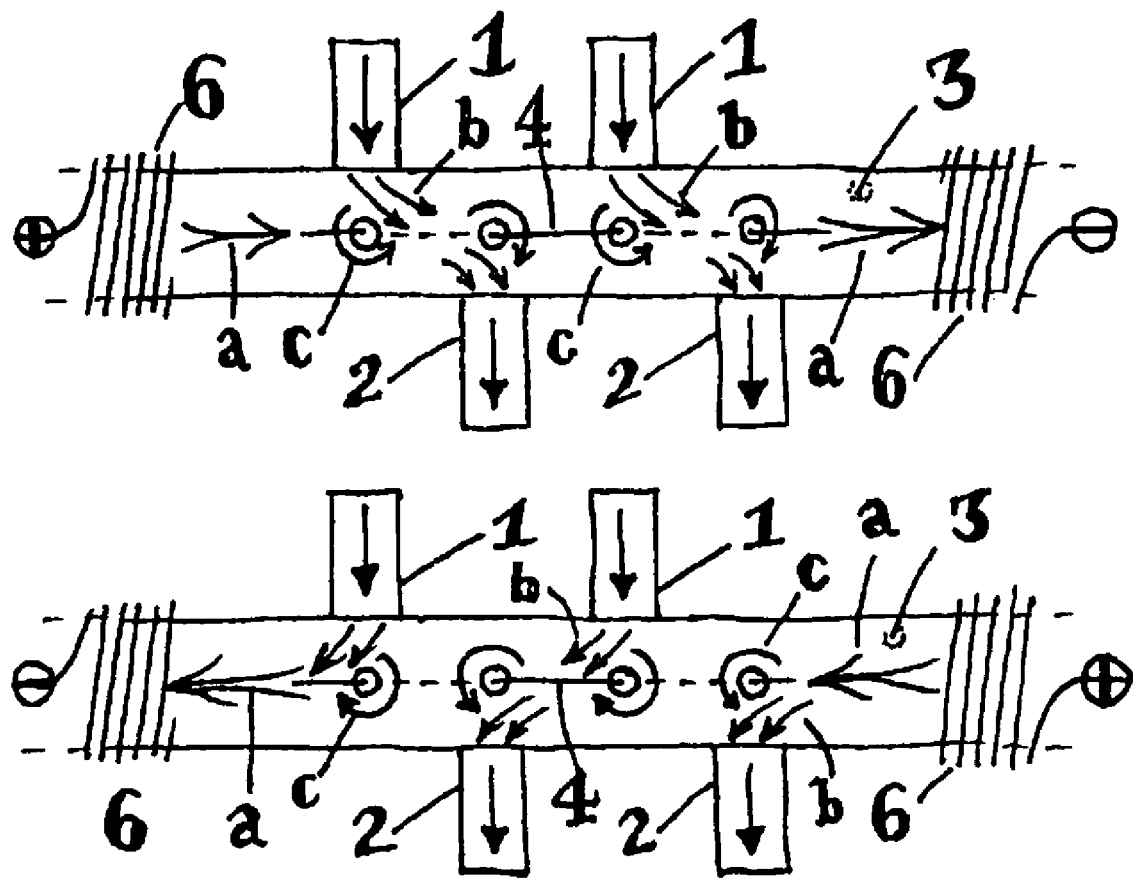
FIG. 3 is a cross sectional elevation showing the magnetic action occurring within the generator of FIGS. 1 and 2.

Numeral 6 in FIGS. 1, 2, and 3 points to a partial illustration of the input winding, or inductive coil used to shift the permanent magnets' fields within the core. Typically, this wire coil encircles the core, wrapping around it. For the toroidal core presented, input coil 6 resembles the outer windings of a typical toroidal inductor, a common electrical component. For the sake of clarity, only a few turns of coil 6 are shown in each of drawing FIGS. 1, 2, and 3. In practice, this coil may cover the entire core, or specific sections of the core, including or not including the magnets, while remaining within scope of the present invention.

FIG. 2 shows the same representative generator of FIG. 1, looking transparently "down" through it from above, so the relative positions of the core holes (dotted lines), the path of the output wire, and magnet positions (as shaded areas) are made clear.

The generator shown uses a core with 8 radially drilled holes. The spacing between these illustrative holes is equal. As shown, each hole is displaced 45 degrees from the next. All holes' centers lay along a common plane; this imaginary plane is centered half-way along the core's vertical thickness. Cores of any shape and size may include as few as two, or as many as hundreds of holes, and a similar number of magnets. Other variations exist, such as generators with multiple rows of holes, zigzag and diagonal patterns, or output wire 4 molded directly into the core material. In any case, the basic magnetic interaction shown in FIG. 3 occurs for each hole in the core, as detailed below.

FIG. 3 shows the same design, viewed broadside. The curvature of the core has been flattened to the page for the purpose of illustration. The magnets are represented schematically, protruding from core top and bottom, with arrows indicating the direction of magnetic flux—arrow heads pointing north, tails south.

In practice, the free, unattached polar ends of the generator's magnets may be left as-is, in open air, or provided with a common ferromagnetic path linking unused North and South poles together, as a magnetic "ground". This common return path is typically made of steel, iron or similar material, taking the form of a ferrous enclosure housing the device. It may serve the additional purpose of a protecting chassis. The magnetic return may also be another ferromagnetic core in repetition of the present invention, forming a stack or layered series of generators, sharing common magnets between generator cores. Any such additions are without direct bearing on the functional principle of the generator itself, and have therefore been omitted from these illustrations.

Two example flux diagrams are given in FIG. 3. Each example is shown in a space between schematically depicted partial input coils 6. A positive or negative polarity marker indicates the direction of input current, applied through the input coil. This applied current produces "modulating" magnetic flux, which is used to synthesize motion of the permanent magnets, and is shown as a double-tailed horizontal arrow (a) along the core 3. Each example shows this double-tailed arrow (a) pointing to the right or the left depending on the polarity of applied current.

In either case, vertical flux entering the core (b, 3) from the external permanent magnets (1, 2) is swept along, within the core, by the direction of the double-tailed arrow representing the input coil's magnetic flux (a). These curved arrows (b) in the space between the magnets and holes can be seen to shift or bend (a->b), as if they were streams or jets of air subject to a changing wind (a).

The resulting sweeping motion of the permanent magnets' fields causes their flux (b) to brush back and forth over the holes and wire 4 passing through these holes. Just as in a mechanical generator, when magnetic flux brushes or "cuts" sideways across a conductor in this way, EMF or voltage is induced. By connecting an electrical load across the ends of this wire conductor (Numeral 5, in FIGS. 1, 2) a current is allowed to flow through the load in a closed circuit, delivering electrical power able to perform work. Input of an alternating current across the input coil 6 generates an alternating magnetic field (a) causing the fields of permanent magnets 1, and 2 to shift (b) within the core 3, inducing electrical power through a load (attached to terminals 5), as if the fixed magnets (1,2) themselves were physically moving. However, no mechanical motion is present.

In a mechanical generator, induced current powering an electrical load returns back through output wire 4 creating a secondary induced magnetic field, exerting forces which substantially oppose the original magnetic field inducing the original EMF. Since load currents induce their own, secondary magnetic fields opposing the original act of induction in this way, the source of the original induction requires additional energy to restore itself and continue generating electricity. In mechanical generators, the energy-inducing motion of the generator's magnetic fields is being physically actuated, requiring a strong prime mover (such as a steam turbine) to restore the EMF-generating magnetic fields' motion, against the braking effect of the output-induced magnetic fields (the induced field (c), and the inducing field (b)), destructively in mutual opposition. It is this inductive opposition which ultimately must be overcome by physical force, which is commonly produced by consumption of other energy resources.

The generator of the present invention makes use of the induced, secondary magnetic field in such a way as to not cause opposition, resulting in efficient magnetic field motion. Because the magnetic fields do not act to destroy one another in mutual opposition, the present invention is a highly efficient energy conversion apparatus.

The present generator's induced magnetic field, resulting from electric current flowing through the load and returning through output wire 4, is that of a closed loop encircling each hole in the core admitting the output conductor or conductive medium (4, c). The present generator's induced magnetic fields create magnetic flux in the form of closed loops within the ferromagnetic core. The magnetic field "encircles" each hole in the core carrying output wire 4, similar to the threads of a screw "encircling" the shaft of the screw.

Within this generator, the magnetic field from output medium or wire 4 immediately encircles each hole formed in the core (c) carrying this medium or wire 4. Since wire 4 may take an opposing direction through each neighboring hole, the direction of the resulting magnetic field will likewise be opposite. The directions of arrows (b) and (c) are, at each hole, opposing, headed in opposite directions, since (b) is the inducing flux and (c) is the induced flux, each opposing one another while generating electricity.

However, this magnetic opposition is effectively directed against the permanent magnets that are injecting their flux into the core, but not the source of the alternating magnetic input field 6. In the present solid state generator, induced output flux (4, c) is directed to oppose the permanent magnets (1, 2) not the input flux source (6, a) that is synthesizing the virtual motion of those magnets (1, 2) by its magnetizing action on core 3.

The present generator employs magnets as the source of motive pressure driving the generator, since they are the entity being opposed or "pushed against" by the opposing reaction induced by output current which is powering a load. Experiments show that high-quality permanent magnets can be magnetically "pushed against" in this way for very long periods of time, before becoming demagnetized or "spent".

FIG. 3 illustrates inducing representative flux arrows (b) directed oppositely against induced representative flux (c). In materials typically used to form core 3, fields flowing in mutually opposite directions tend to cancel each other, just as positive and negative numbers of equal magnitude sum to zero.

On the remaining side of each hole, opposite the permanent magnet, no mutual opposition takes place. Induced flux (c) caused by the generator load currents remains present; however, inducing flux from the permanent magnets (b) is not present since no magnet is present, on this side, to source the necessary flux. This leaves the induced flux (c) encircling the hole, as well as input flux (a) from the input coils 6, continuing its path along the core, on either side of each hole.

On the side of each core hole where a magnet is present, action (b) and reaction (c) magnetic flux substantially cancel and annihilate, being oppositely directed within the core. On the other side of each hole, where no magnet is present, input flux (a) and reaction flux (c) share a common direction. Magnetic flux thereby adds together in these zones, where induced magnetic flux (c) aids the input flux (a). This is the reverse of typical generator action, where induced flux (c) is typically opposing the "input" flux originating the induction.

Since the magnetic interaction herein is a combination of magnetic flux opposition and magnetic flux acceleration, there is no longer an overall magnetic braking, or total opposition effect. The braking and opposition is counterbalanced by a simultaneous magnetic acceleration within the core. Since mechanical motion is absent, the equivalent electrical effect ranges from idling, or absence of opposition, to a strengthening and overall acceleration of the electrical input signal (within coils 6). Proper selection of the permanent magnet (1, 2) material and flux density, core 3 material magnetic characteristics, core hole pattern and spacing, and output medium connection technique create embodiments wherein the present generator will display an absence of electrical loading at the input and/or an overall amplification of the input signal. This ultimately causes less input energy to be required in order to work the generator. Therefore, as increasing amounts of energy are withdrawn from the generator as output power performing useful work, decreasing amounts of energy are generally required to operate it. This process endures, working against the permanent magnets (1, 2) until they are demagnetized.

Figure 4:
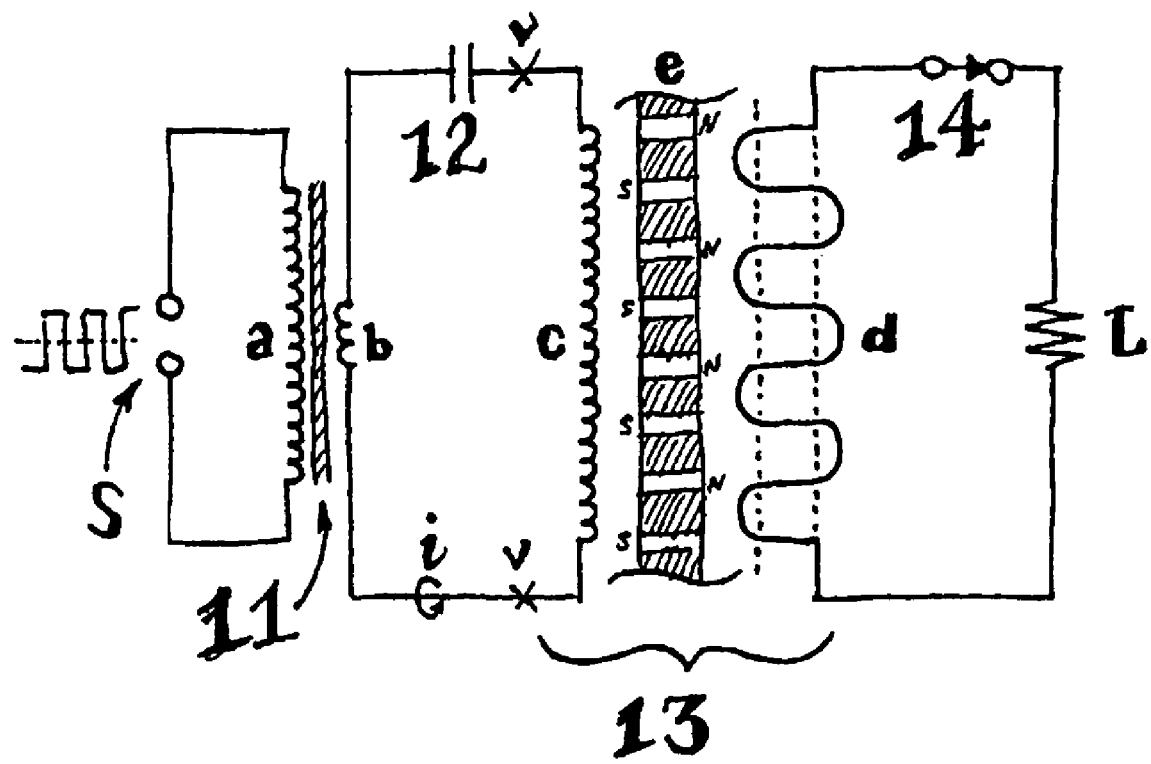
FIG. 4 is a schematic circuit diagram, illustrating one method of electrically operating the generator of this invention.

In an embodiment of this invention, FIG. 4 illustrates a typical operating circuit employing the generator of this invention. A square-wave input signal, furnished by appropriate transistorized switching means, is applied at the input terminals (S), to the primary (a) of a step-down transformer 11. The secondary winding (b) of the input transformer may be a single turn, in series with a capacitor 12 and the generator 13 input coil (c), forming a series resonant circuit. The frequency of the applied square wave (S) must either match, or be an integral sub-harmonic of the resonant frequency of this 3-element transformer-capacitor-inductor input circuit.

Generator 13 output winding (d) is connected to resistive load L through switch 14. When switch 14 is closed, generated power is dissipated at L, which is any resistive load, for example, an incandescent lamp or resistive heater.

Once input resonance is achieved, and the square wave input frequency applied at S is such that the combined reactive impedance of total inductance (b+c) is equal in magnitude to the opposing reactive impedance of capacitance 12, the electrical phases of current through, and voltage across, generator 13 input coil (c) will flow 90 degrees apart in resonant quadrature. Power drawn from the square wave input-energy source applying power to S will now be at a minimum.

In this condition, the resonant energy present at the generator input may be measured by connecting a voltage probe across the test points (v), situated across the generator input coil, together with a current probe around point (i), situated in series with the generator input coil (c). The instantaneous vector product of these two measurements indicates the energy circulating at the generator's input, ultimately shifting the permanent magnets' fields.

It will be apparent to those skilled in the art that a square (or other) wave may be applied directly to the generator input terminals (c) without use of other components. Use of a resonant circuit, particularly with inclusion of a capacitor 12 as suggested, facilitates recirculation of energy within the input circuit, generally producing efficient excitation as loads are applied.

While the foregoing is directed to embodiments of the present invention, other and further embodiments of the invention may be devised without departing from the basic scope thereof, and the scope thereof is determined by the claims that follow.

The invention claimed is:

1. A device for generating electricity, the device comprising;
    a ferromagnetic core would with one or more wire coils acting to magnetically modulate the core,
    at least one permanent magnet having a magnetic flux arranged in proximity to the ferromagnetic core and bearing on the ferromagnetic core such that the magnetic flux of the permanent magnet is coupled to the ferromagnetic core,
    a resonant circuit, having a square wave energy input source, in direct electrical connection with said wire coils operable at frequencies and with sufficient energy to establish magnetic modulation within said ferromagnetic core,
    at least one core hole penetrating the volume of said core; and,
    at least one output wire passing through said core hole, whereby said core hole intercepts magnetic flux from said permanent magnets bearing on said ferromagnetic core.

2. The device of claim 1 wherein the wire coils wound around said ferromagnetic core modulate exposure and interaction between flux from said magnets and said core holes carrying said output wires.

3. The device of claim 2 whereby said modulation of exposure generates electromotive force along said output wires routed through core holes in said core.

4. The device of claim 3, wherein said resonant circuit is comprising a capacitor in association with said wire coil(s) wound around said ferromagnetic core for purpose of magnetically modulating said core.

5. The device of claim 3, wherein said resonant circuit is comprising a capacitor in association with said output wires passing through said core-holes for delivering output power.

6. The device of claim 5 incorporating impedance-matching transformers, inductors, and inductor-capacitor networks in said resonant circuit.

7. The device of claim 3 wherein one or more of said permanent magnets are substituted with one or more electromagnets to generate the required magnetic flux.

8. The device of claim 2 wherein means of magnetically modulating said core is supplemented by exposure to an externally generated magnetic field, such as the Earth's magnetic field, or other independent source of externally generated magnetic flux.

9. The device of claim 2 wherein said output wire carries a superimposed DC current bias generating the required magnetic flux, in substitution of, or in conjunction with said permanent magnets.

10. The device of claim 2 further containing a circuit comprised of one or more electrical reactances in association with said wire coil(s) wound around said ferromagnetic core for magnetically modulating said core, wherein said electrical reactance comprises a capacitor, an inductor, a transformer and combinations thereof.

11. A device for generating electricity from a wave form input, the device comprising;
    a ferromagnetic core being cylindrically shaped having a flat top and a flat bottom being positioned parallel to the top and having an inner and outer circumference surface and having a plurality of holes penetrating the core from the outer circumference surface perpendicularly through the inner circumference,
    at least one permanent magnet positioned above the top of the ferromagnetic core having the north magnetic pole directed downwards and towards the top of the ferromagnetic core with the magnet flux of the north magnetic pole of the permanent magnet positioned above the top of the ferromagnetic core coupled to the ferromagnetic core,
    at least one permanent magnet positioned below the bottom of the ferromagnetic core having the south magnetic pole directed upwards and towards the bottom of the ferromagnetic core with the magnet flux of the south magnetic pole of the permanent magnet positioned below the bottom of the ferromagnetic core coupled to the ferromagnetic core,
    an input wire coil wound around the ferromagnetic core wherein the wire coil is formed by routing a wire over the top of the ferromagnetic core, over the inner circumference of the core, over the bottom of the core, and over the outer circumference of the core repeatedly to form a the input wire coil; and,
    an output wire coil formed by weaving a wire through consecutive hole penetrations through the outer and inner circumference surfaces of the ferromagnetic core so as to form a plurality of windings woven around the entire circumference of the ferromagnetic core and providing an electrical output across the coil when the input wire coil is energized by a square wave input source in direct electrical communication with the input wire coil whereby the interaction of the magnetic flux between the top and bottom permanent magnets and the ferromagnetic core improves the efficiency of the conversion device.

* * * * *